United States Patent
Chrysanthakopoulos et al.

(10) Patent No.: US 9,921,775 B2
(45) Date of Patent: Mar. 20, 2018

(54) MEMORY MANAGEMENT IN A DECENTRALIZED CONTROL PLANE OF A COMPUTING SYSTEM

(71) Applicant: VMware, Inc., Palo Alto, CA (US)

(72) Inventors: Georgios Chrysanthakopoulos, Seattle, WA (US); Pieter Noordhuis, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 71 days.

(21) Appl. No.: 15/195,519

(22) Filed: Jun. 28, 2016

(65) Prior Publication Data

US 2017/0371582 A1 Dec. 28, 2017

Related U.S. Application Data

(60) Provisional application No. 62/355,541, filed on Jun. 28, 2016.

(51) Int. Cl.
*G06F 3/06* (2006.01)

(52) U.S. Cl.
CPC ............ *G06F 3/0647* (2013.01); *G06F 3/064* (2013.01); *G06F 3/0608* (2013.01); *G06F 3/0652* (2013.01); *G06F 3/0659* (2013.01); *G06F 3/0673* (2013.01)

(58) Field of Classification Search
CPC ...... G06F 3/0647; G06F 3/0608; G06F 3/064; G06F 3/0652; G06F 3/0659; G06F 3/0673
USPC .................. 711/159, 154, 156, 170; 707/813
See application file for complete search history.

(56) References Cited

U.S. PATENT DOCUMENTS

| | | | | |
|---|---|---|---|---|
| 6,681,306 | B1 * | 1/2004 | Kessler | G06F 12/0276 707/999.202 |
| 7,096,329 | B2 * | 8/2006 | Garthwaite | G06F 12/0276 707/999.202 |
| 7,299,277 | B1 * | 11/2007 | Moran | H04L 41/5022 370/230 |
| 7,313,661 | B1 * | 12/2007 | Dmitriev | G06F 12/0253 711/159 |

(Continued)

OTHER PUBLICATIONS

Diego Kreutz et al., "Towards Secure and Dependable Software-Defined Networks", pp. 1-6, Aug. 16, 2013.

(Continued)

*Primary Examiner* — Stephen Elmore
(74) *Attorney, Agent, or Firm* — Patterson & Sheridan, LLP

(57) ABSTRACT

A method of managing memory of a control plane for services in a computer system that includes executing a service host process of the control plane on a software platform of the computer system, the service host process including runtime software configured to manage lifecycles of objects representing the services, the objects being associated with the service host process and being marked as available; determining an amount of memory in the computer system consumed by the objects; marking a plurality of the objects as paused in response to the amount of memory consumed by the objects exceeding a threshold; storing at least a portion of a runtime context of each of the plurality of objects in storage of the computer system; and disassociating the plurality of objects from the service host process to reclaim memory consumed by the objects.

20 Claims, 12 Drawing Sheets

(56) References Cited

U.S. PATENT DOCUMENTS

| | | | |
|---|---|---|---|
| 7,325,106 B1* | 1/2008 | Dmitriev | G06F 12/0253 711/159 |
| 7,340,494 B1* | 3/2008 | Detlefs | G06F 12/0269 |
| 7,469,324 B2* | 12/2008 | Tene | G06F 12/0269 707/999.202 |
| 7,653,793 B1* | 1/2010 | Garthwaite | G06F 12/0269 711/159 |
| 8,185,651 B2* | 5/2012 | Moran | H04L 47/10 709/224 |
| 8,694,562 B2* | 4/2014 | Basu | G06F 12/0276 707/814 |
| 9,229,754 B2* | 1/2016 | Soundararajan | G06F 9/5077 |
| 9,257,092 B2* | 2/2016 | Spracklen | H04N 21/4621 |
| 9,792,163 B1* | 10/2017 | Chrysanthakopoulos | G06F 9/541 |
| 2004/0044873 A1* | 3/2004 | Wong | G06F 12/0246 711/218 |
| 2004/0172507 A1* | 9/2004 | Garthwaite | G06F 12/0276 711/159 |
| 2005/0166025 A1* | 7/2005 | Wong | G06F 12/0246 711/165 |
| 2014/0112192 A1 | 4/2014 | Chou et al. | |
| 2015/0261670 A1* | 9/2015 | Cheriton | G06F 12/0253 711/159 |
| 2016/0105534 A1 | 4/2016 | Li et al. | |
| 2016/0117186 A1* | 4/2016 | Soundararajan | G06F 9/5077 718/1 |
| 2016/0142769 A1* | 5/2016 | Spracklen | G06F 3/1454 725/132 |

OTHER PUBLICATIONS

U.S. Appl. No. 15/195,503 Office Action dated Jan. 26, 2017 consists of 14 pages.

* cited by examiner

MEMORY MANAGEMENT IN A DECENTRALIZED CONTROL PLANE OF A COMPUTING SYSTEM

CROSS-REFERENCE TO RELATED APPLICATIONS

This application claims priority to U.S. Provisional Patent Application Ser. No. 62/355,541, filed Jun. 28, 2016, which is incorporated by reference herein in its entirety.

BACKGROUND

The use of monolithic applications in a computing system, such as a cloud computing system, is gradually being replaced by sets of loosely coupled, independent services. Factoring applications into small services (sometimes referred to as "micro-services") allows those services to have a developmental and operational lifecycle that is independent of their peers. These services typically have a smaller set of responsibilities than their monolithic predecessors, as well as a well-defined application programming interface (API).

The use of such a system of micro-services also comes at a cost: every service may use its own data model, use its own backing store, and define its own interfaces and its own interaction models. As the number of services increases, it becomes difficult to administer the system. For example, different services may use a combination of synchronous and asynchronous APIs, different transports, different serialization formats, their own facilities for authentication and authorization, and so forth. As such, administrators and operators of such systems must possess deep system knowledge to identify runtime issues, and must be informed of the intricacies of every new service added to the system. The proliferation of service technologies also means that users of the system have to use various methods to interact with the system, with varying degrees of observability and extensibility.

SUMMARY

One or more embodiments provide a method of managing memory of a control plane for services in a computer system that includes executing a service host process of the control plane on a software platform of the computer system, the service host process including runtime software configured to manage lifecycles of objects representing the services, the objects being associated with the service host process and being marked as available; determining an amount of memory in the computer system consumed by the objects; marking a plurality of the objects as paused in response to the amount of memory consumed by the objects exceeding a threshold; storing at least a portion of a runtime context of each of the plurality of objects in storage of the computer system; and disassociating the plurality of objects from the service host process to reclaim the memory consumed by the objects.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Decentralized Control Plane Architecture

Figure 1:
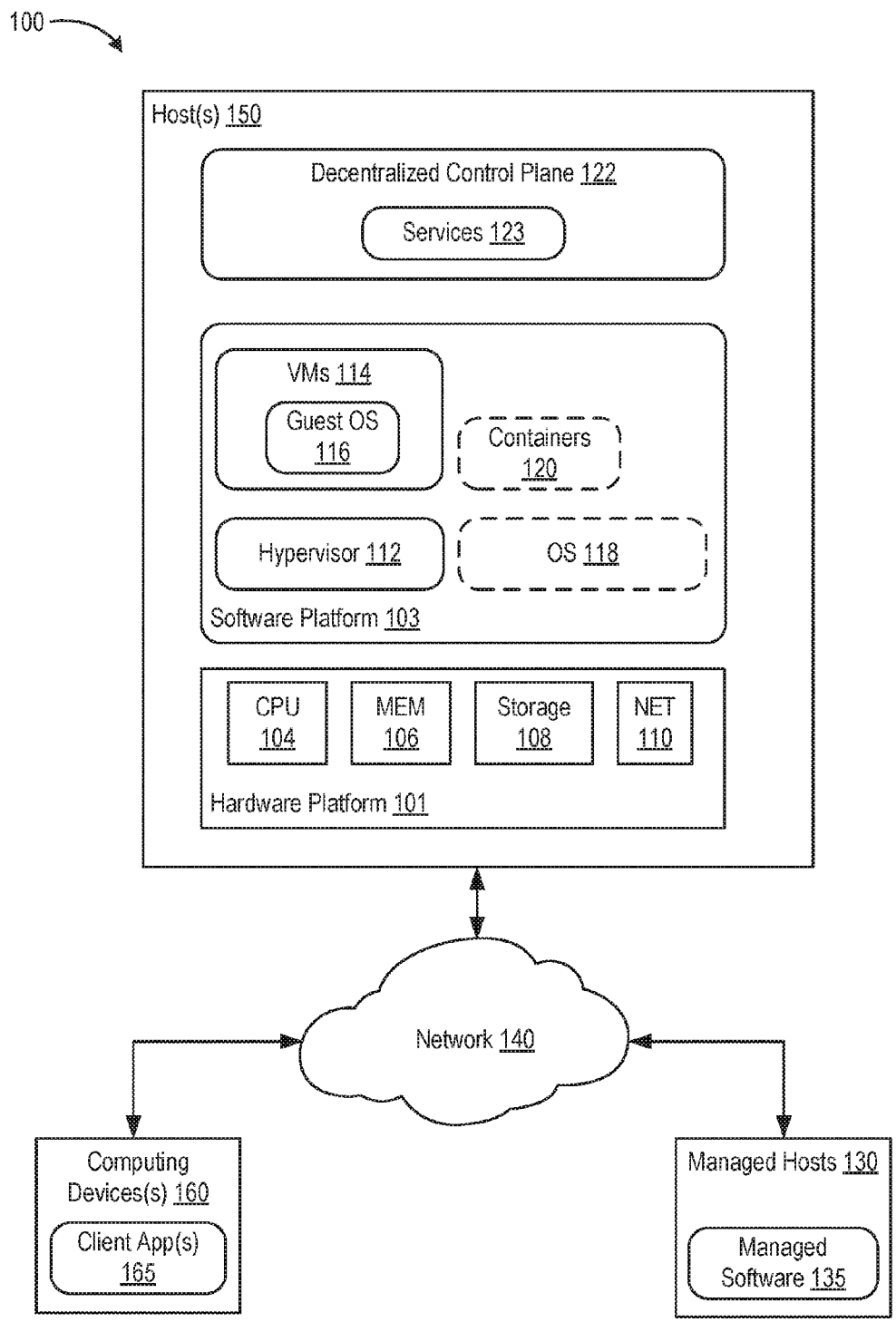
FIG. 1 is a block diagram depicting an embodiment of a computer system supporting execution of decentralized control plane (DCP) software.

FIG. 1 is a block diagram depicting an embodiment of a computer system 100 supporting execution of decentralized control plane (DCP) software (DCP 122). At least a portion of computer system 100 may be part of an on-premise data center controlled and administrated by a particular enterprise or business organization, part of a cloud computing system operated by a cloud computing service provider, or part of a combination of on-premise data center and cloud computing systems. An-premise data center may sometimes be referred to as a "private" cloud; a cloud computing system may be referred to as a "public" cloud; and a combination thereof may be referred to as a "hybrid cloud."

Computer system 100 includes one or more host computers ("host(s) 150"), a network 140, managed hosts 130, and one or more computing devices 160. Network 140 can include various routers, switches, and like network appliances that facilitate communication among hosts 150, between host(s) 150 and computing device(s) 160, and between host(s) 150 and managed hosts 130. Each host 150 is constructed on a hardware platform 101, such as an x86 architecture platform. As shown, hardware platform 101 includes conventional components of a computing device distributed across host(s) 150, such as central processing units ("CPU 104"), system memory ("MEM 106"), storage resources ("storage 108"), and network resources ("NET 110"). CPU 104 is configured to execute instructions, for example, executable instructions that perform one or more operations described herein. Such executable instructions can be stored in MEM 106 and/or in storage 108. MEM 106 includes devices allowing information, such as executable instructions and data, to be stored and retrieved. MEM 110 may include, for example, one or more random access memory (RAM) modules. NET 110 enables host(s) 150 to interface with network 140 and can include network adapters. Storage 108 includes local storage devices (e.g., one or more hard disks, flash memory modules, solid state disks, and optical disks) and/or storage interfaces to network data storage systems (not shown). Example network data storage systems include storage area networks (SANs), a network-attached storage (NAS), and the like. Data "stored" in storage 108 encompasses both data stored in the local storage devices and data stored on network data storage systems accessible through the storage interfaces.

Host(s) 150 include a software platform 103 executing on hardware platform 101. In an embodiment, software platform 103 includes a virtualization layer that abstracts processor, memory, storage, and networking resources of hardware platform 101 into multiple virtual machines ("VMs 114") that run concurrently on the same hosts. VMs 120 run on top of the virtualization layer, referred to herein as a hypervisor 112, which enables sharing of the hardware resources by VMs 114. One example of hypervisor 112 that may be used in an embodiment described herein is a VMware ESXi™ hypervisor provided as part of the VMware vSphere® solution made commercially available from VMware, Inc. of Palo Alto, Calif. Hypervisor 112 may run directly on hardware platform 101 or on top of an operating system. Each of VMs 114 executes a guest operating system ("guest OS 116"). Guest OS 116 can be any commodity operating system known in the art.

In another embodiment, software platform 103 includes an operating system ("OS 118") that runs directly on hardware platform 101. OS 118 can be any commodity operating system known in the art. In another embodiment, software platform 103 includes containers 120 executing within OS 118. Containers 118 implement operating system-level virtualization, wherein an abstraction layer is provided on top of the kernel of OS 118. The abstraction layer supports multiple containers each including an application and its dependencies. Containers 118 do not include a guest OS and are sometimes referred to as "OS-less containers." Each container runs as an isolated process in userspace and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and containers. The term "virtualization software" as used herein is mean to encompass both a hypervisor and an operating system kernel supporting containers. Each host 150 can include any embodiment of software platform 103 described above.

Software platform 103 provides an interface between DCP 122 and hardware platform 101. DCP 122 can execute in a single host 150 or can be distributed across multiple hosts 150. For any host 150, DCP 122 can execute within guest OS 116 of one or more VMs 114, within OS 118, or within one or more containers 120 running on OS 118. DCP 122 includes a programmable framework and runtime software that enable building and running of distributed, highly-available, and scaled-out services 123 (also referred to as "microservices"). Services 123 include an external representational state transfer (REST) interface and can be implemented by a set of distributed nodes. DCP 122 includes a document store for backing service state and the runtime provides replication, synchronization, ordering, and consistency for the service state. One example of DCP that may be configured and used as described herein is Project Xenon™ distributed by VMware, Inc. of Palo Alto, Calif.

In an embodiment, DCP 122 manages hosts ("managed hosts 130") and software installed on such hosts ("managed software 135"). Managed hosts 130 can be configured similarly to host(s) 150. Managed software 135 can include hypervisors, VMs, guest OS, containers, OS, and the like (similar to software platform 103), as well as applications. DCP 122 can be used to build an IaaS fabric within managed hosts 130. Services 123 can be used for configuration (desired state), workflows (e.g., finite state machine tasks), grooming, scheduling logic, and the like. IaaS implementation is just one example use of DCP 122. In general, DCP 122 includes services that can be used to manage various aspects of managed hosts 130 and managed software 135.

Computing devices 160 can execute client applications 165 to interact with DCP 122. Computing devices 160 can include computers, laptops, tablets, mobile devices, or the like. Client applications 165 can communicate with services of DCP 122 using their REST interfaces. Client applications 165 can start, pause, resume, and stop services of DCP 122 using REST application programming interface (API) commands, as described further below.

Figure 2:
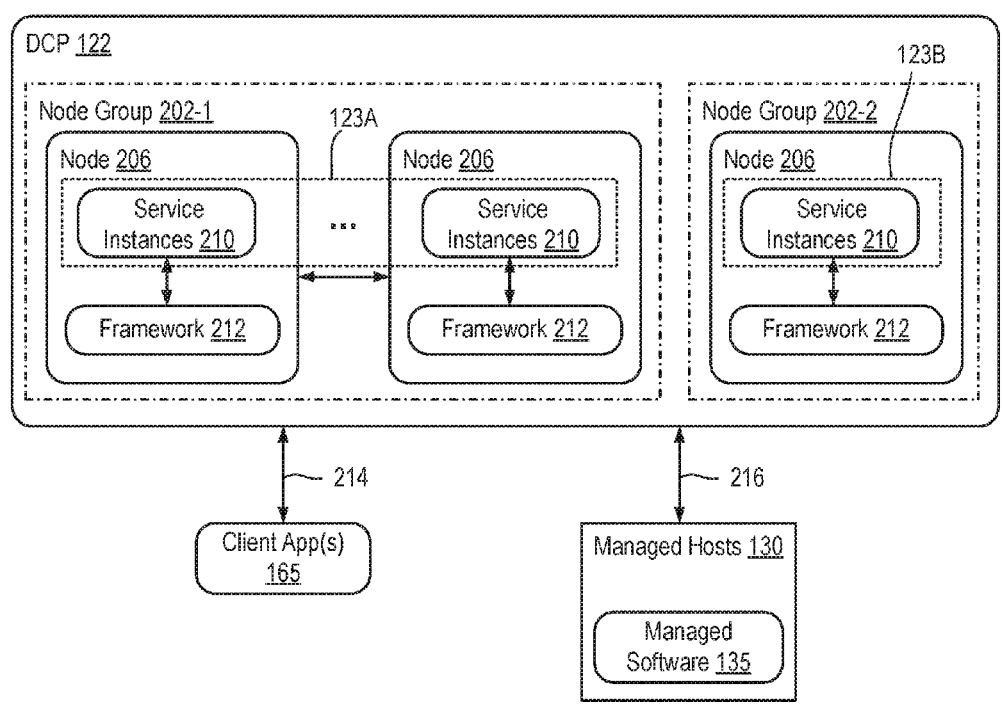
FIG. 2 is a block diagram depicting a DCP according to an embodiment.

FIG. 2 is a block diagram depicting DCP 122 according to an embodiment. DCP 122 includes one or more nodes 206. A "node" is a process, which can execute in various contexts, such as an OS of a host computer, guest OS of a VM, container in an OS, etc. In general, nodes 206 host one or more services 204. Thus, a node is an instance of a "service host process." A node can execute directly on an OS kernel (e.g., compiled C, C++, etc. processes) or within a runtime environment (e.g., Java®, Go™, etc. processes). In various examples described herein, each node 206 is a Java® process with Java® objects, but those skilled in the art will appreciate that the examples can be ported to other programming languages and platforms. Each node 206 is accessed using an Internet Protocol (IP) address and transmission control protocol (TCP) port. A given host environment (e.g., OS, guest OS, container, etc.) can host one or more nodes. In cases where a host environment hosts multiple nodes, each node can be assigned a different IP address and/or TCP port. For example, a service of DCP 122 named Examples can be accessed on a node localhost through port 8000 using a uniform resource indicator (URI) http://localhost:8000/core/examples.

A "service" is a logical object in DCP 122 having a unique URI. An example URI of a service is /core/examples/example1. A service is managed externally through a REST API. Each node 206 hosts one or more service instances 210. A "service instance" is an object within a node that handles requests targeting a service 123 of DCP 122 (referred to as a "service object"). On a given node 206, the URI of a service 123 maps to a service instance 210. For example, if a node 206 is a Java® process, a service instance 210 can be a Java® object instantiated in the Java® process. A "request" is a message including verb mapped to an action of the REST API. In an embodiment, the REST API supports actions mapped to hypertext transfer protocol (HTTP) verbs, such as POST, DELETE, PATCH, PUT, and GET. A "response" is a message including status and potentially results of a request.

A service 123 of DCP 122 is implemented by one or more service instances 210 within one or more nodes. Nodes 206 can be organized in node groups, e.g., node group 202-1 and node group 202-2 (generally node groups 202). Each node group 202 includes one or more nodes 206. In the example, node group 202-1 includes a plurality of nodes 206, whereas node group 202-2 includes a single node 206. Services 123 can be instantiated across a plurality of nodes (i.e., a given service 123 can be implemented using a plurality of service instances 210 across a plurality of nodes 206). In such case, services instances 210 include the same URI at their respective nodes (e.g., /core/examples/example1) and implement a single service 123. Multiple service instances 210 can be implemented on a single node, in which case each service instance includes a unique URI and represents a unique service (e.g., /core/examples/example1 and /core/examples/example2). Unique services can be of the same service type (e.g., /core/examples/example1 and /core/examples/example2 can have an example service type). In the example, services 123A are distributed across nodes 206 in node group 202-1, and services 123B are implemented by node 206 in node group 202-2.

Each node 206 provides a framework 212. Framework 212 provides runtime support for service instances 210. Framework 212 provides a plurality of functionalities, such as replication, synchronization, ordering, and consistency of service state. Framework 212 also maintains a document store for persistent storage of states associated with services 123 that are configured as durable. Framework 212 is described further below with respect to FIG. 3.

Client applications 165 interact with services 123 of DCP 122 using an asynchronous request/response protocol 214. In an embodiment, request/response protocol 214 is HTTP. Services 123 can interact with each other using request/response protocol 214. Services 123 can also interact with themselves using request/response protocol 214 (e.g., a service 123 can update its state using a PATCH verb). Services 123 interact with managed hosts 130 and managed software 135 using interface 216, which can operate using any type of protocol (e.g., remote procedure protocol (RPC), HTTP, etc.) that can be used to communicate with and control managed hosts 130 and managed software 135.

Figure 3:
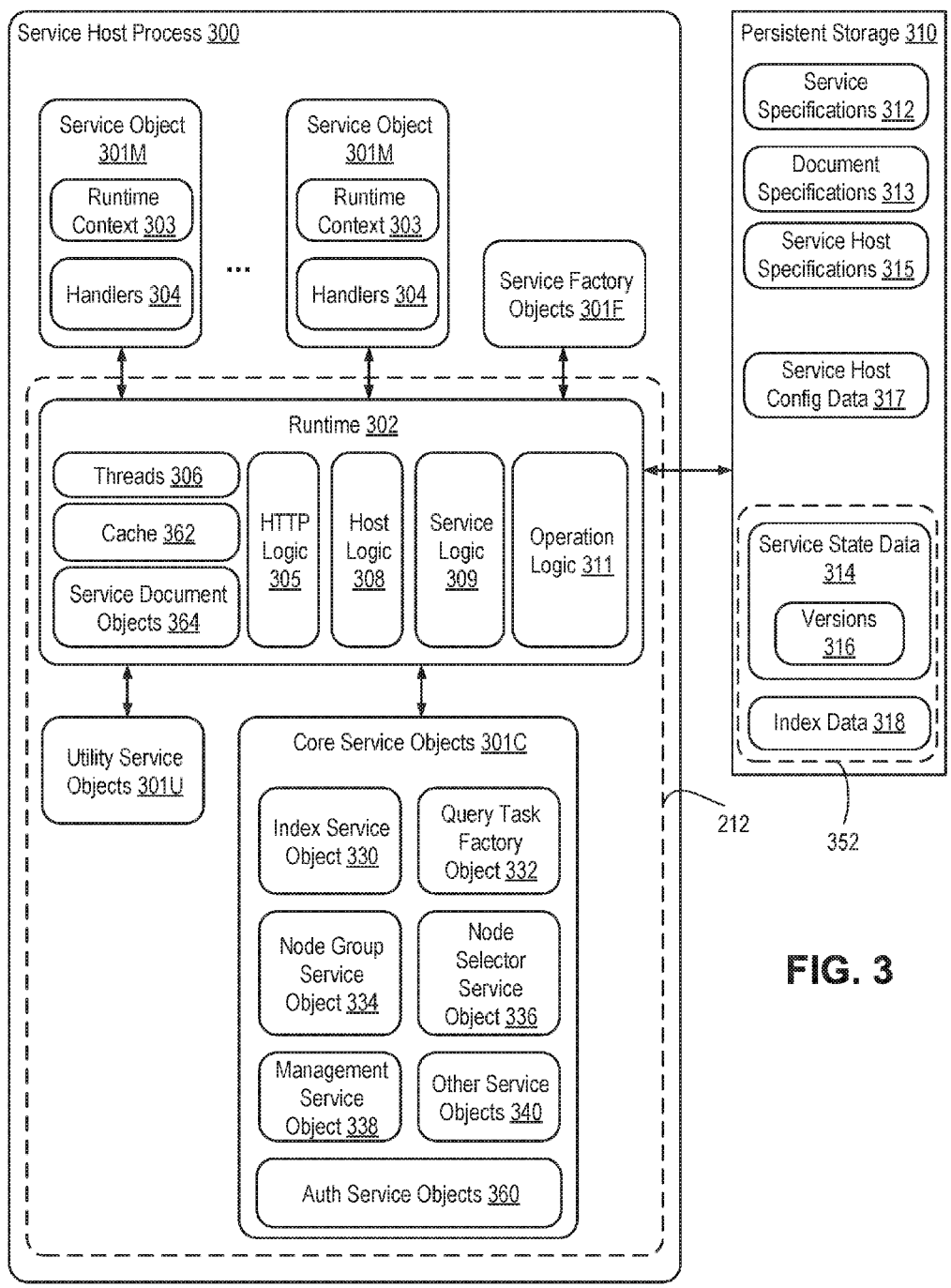
FIG. 3 is a block diagram depicting a service host process of a DCP according to an embodiment.

FIG. 3 is a block diagram depicting a service host process 300 of DCP 122 according to an embodiment. Service host process 300 can be a node 206 of DCP 122 as described above. In the example, service host process 300 includes a plurality of service objects 301M, which are service instances of one or more user-created services. Service host process 300 also includes user-created service factory objects 301F, which can be used to create service objects 301M on request. Service objects 301M and service factory objects 301F are objects created and managed by framework 212.

Framework 212 includes runtime software (referred to as "runtime 302"), utility service objects 301U, and core service objects 301C. Runtime 302 is the code of the service host process executed by CPU 104. Runtime 302 includes HTTP logic 305, host logic 308, service logic 309, and operation logic 311. Runtime 302 also manages a pool of threads 306 within service host process 300. Core service objects 301C are service instances of various framework-supplied services, such as an index service, a query task service, a node group service, a node selector service, a management service, access control services, and various other services. In the embodiment shown, core service objects 301C include an index service object 330, a query task service factory object 332, a node group service object 334, a node selector service object 336, a management service object 338, access control service objects 360, and various other service objects 340, each of which is a service instance for a respective core service. Runtime 302 accesses persistent storage 310, which stores a document store 352, service specifications 312, document specifications 313, service host specifications 315, and service host configuration data 317. Persistent storage 310 is implemented by storage 108. Document store 352 includes a service state data 314 and an index data 318. Service state data 314 can include one or more versions 316 of service states for the services of the control plane.

Services each have a set of capabilities, defined by a plurality of service options. A user can declare the service options for services in service specifications 312. Example service options include PERSISTENCE, REPLICATION, OWNER_SELECTION, and INSTRUMENTATION. The PERSISTENCE service option indicates to runtime 302 that the respective service is durable and should have its state saved in document store 352 (i.e., persistent storage). The REPLICATION service option indicates to runtime 302 that the respective service requires state updates to be replicated among a plurality of nodes. The INSTRUMENTATION service option indicates to runtime 302 that the respective service requires tracking of various statistics. The OWNER_SELECTION service option indicates to runtime 302 that the respective service requires consensus and leader election to be used in the replication protocol. Runtime 302 can be responsive to various other service options.

In general, a user specifies a plurality of service options for services in service specifications 312. In this manner, service specifications 312 define the capabilities of respective services. In an embodiment, classes (e.g., Java® classes) define a service type and service specifications 312 include class definitions for various service types. A portion of an example class definition for a service type in the Java® programming language is shown below:

```
public class ExampleService extends StatefulService {
  public ExampleService( ) {
    super.toggleOption(ServiceOption.PERSISTANCE,
       true);
    super.toggleOption(ServiceOption.REPLICATION,
       true);
    super.toggleOption(ServiceOption.INSTRUMENTA-
       TION, true);
    super.toggleOption(ServiceOption.OWNER_SELEC-
       TION, true);
  }
  . . .
}
```

In the example, a service type named "ExampleService" is declared that extends a base class "StatefulService." The functions of the StatefulService class can be implemented by service logic 309, which is described further below. ExampleService includes a public constructor "ExampleService( )" that makes several calls to a function "toggleOption" of the StatefulService base class for setting service options. The service options are declared as part of an enumeration "ServiceOption." An instance of a service of type ExampleService is a service object generated by creating an instance of the ExampleService class. The above example illustrates one example technique for declaring service options for a service. Other techniques can be employed using the Java® language or other programming languages.

Document specifications 313 specify the specific structure of documents that represent states of services ("service documents"). The terms "service state" and "service document" are used interchangeably herein. A "service document instance" is an object within service host process 300 that stores a service document (referred to as a "service document object" or "service state object"). A service document object is a plain old data object (PODO) (no methods) that includes various fields. A version of the service state for a service is determined by the values of the fields of the service document object. In an embodiment, classes (e.g., Java® classes) define a type of service document and document specifications 312 include class definitions for service document types.

Figure 6:
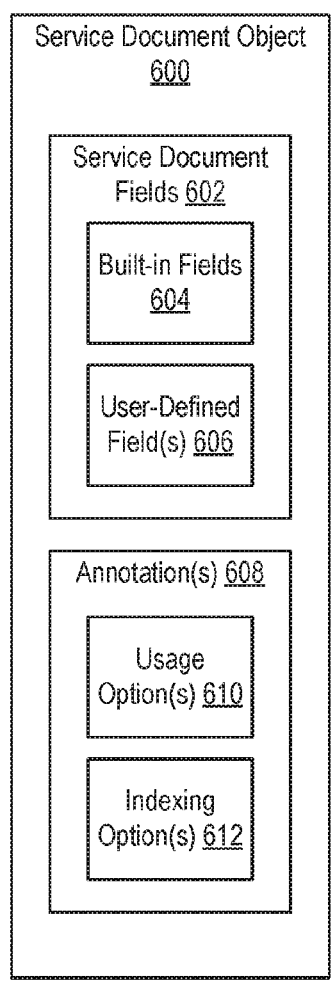
FIG. 6 is a block diagram depicting structure of a service document object according to an embodiment.

FIG. 6 is a block diagram depicting structure of a service document object 600 according to an embodiment. Service document object 600 includes service document fields 602 and optionally one or more annotations 608 to the service document fields 602. Service document fields 602 (also referred to as service document object fields) store values that form the service state. Service document fields 602 can include various data types, such as integers, strings, bytes, collections, maps, Booleans, floating point numbers, dates, URIs, enumerations, tuples, PODOs, and the like. A value stored by each service document field 602 can be a single value (e.g., an integer value, string value, etc.) or multiple values (e.g., a collection of values, map of key/value pairs, etc.). A service document field 602 can include one or more annotations 608. Annotations 608 provide meta-data for one or more service document fields 602.

In an embodiment, annotations 608 include usage options(s) 610 and indexing option(s) 612. Usage option(s) 610 can include one or more annotations related to how a service document field is used, such as single-assignment (i.e., indicates the field is immutable), optional (indicates that the field may or may not have a value), service-use (indicates that the field is only for use by the service and not visible to the client), infrastructure-use (indicates that the field is only for use by the runtime and not visible to the service instances or clients), link (indicates that the field is a link to another document), and the like. Indexing option(s) 612 include one or more annotations related to how a service document field should be processed when the service document is parsed for indexing and storage. Indexing option(s) 612 can include expand (indicates that a multi-value field, such as a PODOs, should have all its fields indexed and stored), store-only (indicates that the field should not be indexed, but only stored), text (indicates that the field should be indexed and stored as text), sort (indicates that the field should be indexed in a manner that enables sorting), and the like.

Service document fields 602 can include built-in fields 604 and user-defined field(s) 606. Built-in fields 604 are used by framework 212 (e.g., part of a ServiceDocument base class). Built-in fields include various fields, such as a document kind field, a self-link field (e.g., to hold a URI of the corresponding service), an authorized principal link field (e.g., to hold a URI of a user who owns the document), a document description field, document update time field, document version field, document epoch field, and the like. User-defined field(s) 606 include one or more fields defined by a user for storing service state of a user-defined service.

Returning to FIG. 3, an example class definition of a document type implemented in Java® is shown below:

```
public class ExampleService extends StatefulService {
    public static class ExampleServiceState extends
        ServiceDocument {
        public static final String FIELD_NAME_KEY_VAL-
            UES=
            "keyValues";
        public Map<String, String> keyValues=new
            HashMap< >( );
        public Long counter;
        @UsageOption(option=
            PropertyUsageOption.AUTO_MERGE_IF_NOT-
                _NULL)
        Public String name;
    }
    . . .
}
```

In the example, the ExampleService class includes a nested class "ExampleServiceState" that extends a "ServiceDocument" base class. The ExampleServiceState class includes fields "keyValues," "counter," and "name." The keyValues field is a multi-valued field having a Map<string, string> type, the counter field is a single-valued field having an integer type, and the name field is a single-valued field having a string type. The name field includes a usage option annotation AUTO_MERGE_IF_NOT_NULL, which indicates that the field is updated if its value is not null during an update operation. The above example illustrates one example technique for declaring structure of a service document. Other techniques can be employed using the Java® language or other programming languages.

Runtime 302 creates service document objects 364 to store service states for use by handlers 304 of service instances 210. Each handler 304 comprises a software function configured to process a particular type of request. Each service document object 364 stores a version of service state. Service document objects 364 are stored in memory 106 of host computer 150 (e.g., in-memory service state). Service document objects 364 can be created and destroyed as handers 304 and other functions are invoked and completed. In some embodiments, runtime 302 can maintain a cache 362 for temporarily storing service document objects 364 longer than a single function or handler 304 call. Cache 362 is stored in memory 106 of host computer 150. For a durable service, its service document is stored persistently in document store 352. For a non-durable service, its service document is only stored for as long as a respective service document object is stored in memory (e.g., held in cache 362). In an embodiment, document store 352 is log-append structured storage. To save a service document, framework 212 appends the service document to service state data 314 in document store 352. If a service document is saved multiple times, then document store 352 will include multiple versions 316 of the service document. When a service document is saved, framework 212 can index at least a portion of the service document by adding to index data 318.

Each service factory object 301F is an instance of a service factory. A "service factory" is a service used to create child services. Each service factory object 301F is used to create child service objects (e.g., service objects 301M) during runtime. In an embodiment, service factory objects 301F are singletons (e.g., only one service factory object per service factory in a given service host process) and are not durable. Each service factory object 301F can include handlers for POST and GET verbs of the REST API. The handler for the POST verb creates a service object. The handler for the GET verb provides a list of created service objects and their state. An example class definition and instantiation of a service factory for a service implemented in Java® is shown below:

```
public class ExampleService extends StatefulService {
    public static FactoryService createFactory( ) {
        return FactoryService.createIdempotent
            (ExampleService.class,
            ExampleServiceState.class);
    }
    . . .
}
public class DecentralizedControlPlaneHost extends ServiceHost {
    public ServiceHost start( ) {
        // Start the example service factory
        super.startFactory(ExampleService.class,
            ExampleService::createFactory);
        . . .
        . . .
    }
    . . .
}
```

In the example, the ExampleService class includes a class function "createFactory( )" that is used to create an instance of FactoryService. The createFactory( ) function calls a class function "createIdempotent" of a base class "FactoryService" to create the service object. A singleton instance of FactoryService is started on host start with a "start( )" function of "DecentralizedControlPlaneHost" that extends a "ServiceHost" base class. The functions of the ServiceHost base class can be implemented by host logic 308, which is described further below.

Host logic 308 is configured to manage service lifecycle and handle delivery of operations to services (remote and local). Host logic 308 maintains a runtime context that includes various information, such as IP address, TCP port number, node ID, and the like. At least a portion of the runtime context of host logic 308 can be saved in service host configuration data 317. Host logic 308 includes various methods for initialization of runtime 302, as well as starting, stopping, pausing, resuming, etc. of core services, service factories, utility services, and user-created services. Host logic 308 can also include methods for applying authorization policies, loading service state from and saving service state to document store 352, caching service state, queuing and forwarding requests to service objects, and performing maintenance on services. Host logic 308 also schedules service handlers to use threads 306 when the service handlers are invoked. As described in the example above, a user can extend host logic 308 to include various customizations (e.g., custom start methods).

Service logic 309 is configured to implement base functionality for services. For example, service logic 309 can implement the functions of the StatefulService base class described in the examples above. Service logic 309 includes functions for queueing requests, checking service state, handling requests, loading and linking service state, validating updates to service state, handling REST API verbs, handling request completions, handling replication, and handling synchronization. For some functions, service logic 309 can cooperate with functions of host logic 308.

Operation logic 311 is configured to implement functionality for encapsulating the request/response pattern of client to service and service-to-service asynchronous communication. Operation logic 311 includes functions for creating operation objects and associating the operation objects with a response/request message, and associating the operation objects with service state objects. Operation logic 311 also includes functions for indicating whether an operation object is from replication, synchronization, or notification, and whether the operation object includes proposed state or committed state.

Figure 7:
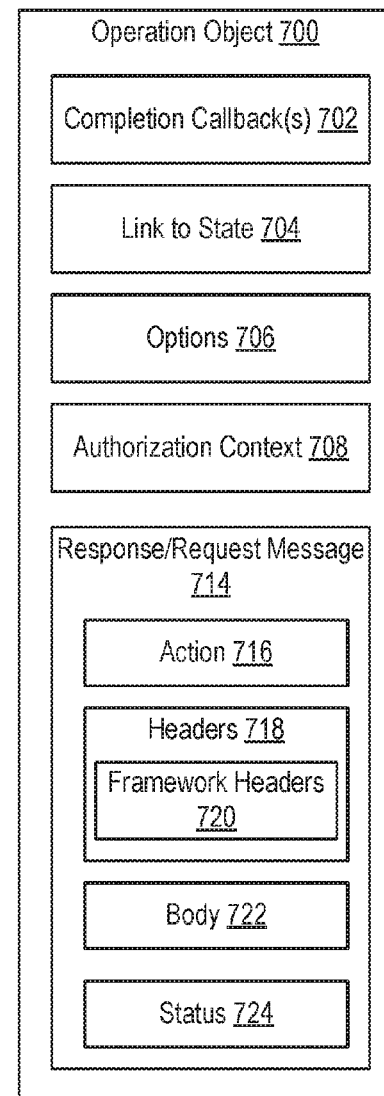
FIG. 7 is a block diagram depicting an operation object according to an embodiment.

FIG. 7 is a block diagram depicting an operation object 700 according to an embodiment. Operation object 700 includes one or more completion callbacks 702, a link to state 704, options 706, an authorization context 708, and response/request message 714. Completion callback(s) 702 points to procedure(s) to be called in response to completion of operation 700. Link to state 704 is a reference to a service document object in memory. Options 706 can include various options, such as a replication option to indicate that the operation object is part of the replication protocol, a forwarding option to indicate that the operation object has been forwarded from another node, a notification option to indicate that the operation object is part of the notification protocol, and the like. Authorization context 708 includes information that can be used to authorize a request. Response/request message 714 can include an action 716, headers 718, a body 722, and status 724 depending on the type of message. Action 716 indicates an HTTP verb. Headers 718 can include various HTTP headers. In addition, headers 718 can include framework headers 720. Framework headers 720 include proprietary headers used by framework 212. Body 722 includes the body of a request or response message. Status 724 includes a status code for a response message. For actions that perform updates to service state (e.g., PUT or PATCH), body 722 includes the update data.

Returning to FIG. 3, each service object 301M includes a runtime context 303 and handers 304. Runtime context 304 can store various information for service object 301M, such as a current processing stage of the service object (e.g., created, available, stopped, etc.), the current version of service state, the current epoch for replication, and the like. Runtime context 304 is the portion of a service object 301M that is stored in memory. Handlers 304 can include functions invoked by runtime 302 when services are created, started, paused, resumed, and stopped. Handlers 304 can include functions invoked by runtime 302 for verbs of the REST API (e.g., GET, PUT, PATCH, DELETE, POST). Handlers 304 can extend or replace functionality of service logic 309. Handlers 304 can supply required functionality not present in service logic 309 (e.g., PUT and PATCH handlers). A user can specify handlers 304 as part of service specifications 312 (e.g., methods in a class definition). When a handler 304 is invoked, host logic 308 allocates a thread 306 to the handler.

An example definition of a PUT handler for a service implemented in Java® is shown below:

```
public class ExampleService extends StatefulService {
    public void handlePut(Operation put) {
        ExampleServiceState newState = getBody(put);
        ExampleServiceState currentState = super.getState(put);
        // example of structural validation
        If (currentState.name != null && newState.name == null) {
            put.fail(new IllegalArgumentException("name must be
                set"));
            return;
        }
        updateCounter(newState, currentState, false);
        // replace current state with the body of the request
        super.setState(put, newState);
        put.complete( );
    }
    ...
}
```

In the example, the class ExampleService includes a handler "handlePut( )" for handling PUT requests. The handlePut( ) function receives an "Operation" parameter put that references an operation object encapsulating the request. The handlePut( ) function first gets newState from the body of the request using a function getBody( ) and current State of the service using a function getState( ) of the superclass. The handlePut( ) function then validates newState and calls the fail( )method of put if invalid. The handlePut( ) function then calls a private function updateCounter( ) to update the counter field of the service state. The handlePut( ) function then replaces the current state with the state in the body of the request using the function setState( ) of the superclass. Finally, the handlePut( ) function invokes the complete( ) function of put. Other techniques can be employed using the Java® language or other programming languages for implementing a handler.

Clients access framework 212 and services using the REST API. HTTP logic 305 manages REST API transactions with clients. In an embodiment, the REST API includes HTTP actions POST, DELETE, PATCH, PUT, and GET. Sending POST to a service factory creates an instance of a service (i.e., a service object 301M). Sending POST to a service can be used to compute work or add new resources on a service. Sending DELETE to a service stops the service and creates a new empty state. Sending PATCH to a service can be used to update at least a portion of service state. Sending PUT to a service can be used to replace service state in its entirety. Sending GET to a service can be used to retrieve the state of the service. Sending GET to a service can lead to several asynchronous operations to other services to collect their states, which the service then composes on the fly and returns as its state.

In an embodiment, runtime 302 (e.g., host logic 308) starts one or more utility service objects 301U for each service object. Utility service objects 301U are instances of various utility services, such as a subscription service, statistic service, user interface (UI) service, configuration service, template service, and availability service. The subscription service can be used to provide a list of subscribers to a service. A service notifies its subscribers in response to state changes. The statistics service can be used to report various runtime statistics associated with services. The UI service can be used to render a UI on a client for accessing a service. The configuration service can be used to change service options or other configuration data during runtime. The template service can be used to provide a default state for a service. The availability service can be used to determine if a service is ready to accept requests. These are just some examples of utility services that can be instantiated by runtime 302 per service. In an embodiment, the utility services (e.g., subscription, statistics, UI, configuration, template utility services) can be implemented on service host process 300 using a single utility object 301U.

Runtime 302 (e.g., host logic 308) also creates core service objects 301C. Core service objects 301C are instances of various core services. The index service manages document store 352. Index service object 330 handles requests on behalf of runtime 302 and service objects 301M for storing and retrieving service documents at service host process 200. Index service object 330 also manages versioning and indexing of service documents at service host process 200.

Query task factory service creates query task services upon request. Remote clients or local clients (e.g., service objects 301M) can send requests to query task factory service, which are handled on service host process 300 by query task factory service object 332, to create query task services. Query task services cooperate with the index service to perform various queries to obtain service state information.

Node group service tracks node membership across node groups. Node group service employs a scalable gossip layer to manage node group membership. In an embodiment, node selector service selects owner nodes within a given node group using a consistent hashing algorithm. Runtime 302 can use node group service object 334 to forward requests to owner nodes for services that implement replication with consensus as described herein. Runtime 302 can use node selector service object to determine owner nodes. Management service provides a REST front end for changing various configuration data, such as TCP port, maintenance intervals, etc. Access control services control user access to services. When authentication and authorization are enabled, all requests to a service are subject to two additional checks: (1) Is the request on behalf of a valid user? (2) Is that user authorized to perform the desired action of the service? Any unauthorized access will result in a "forbidden" response from framework 212. Core service objects 301C can include various other service objects 340, such as instances of DNS services, log services, JavaScript services, and the like.

Framework 212 is configured to support clustering, that is, the ability to group together a set of nodes for the purposes of scale-out, high-availability, and unified management. Framework 212 manages node group membership (e.g., using node group service), balancing and forwarding of requests, replication, and synchronization. As discussed above in FIG. 2, a node group includes a plurality of nodes. A given node can belong to multiple node groups. A service belongs to a single node group. Node group service manages group membership using a gossip protocol. In general, a new node joins the node group through an existing member. Each node in the node group sends its view of membership to peer nodes in the node group during maintenance intervals (e.g., using a PATCH request handled by node group service object 334). Nodes can update their view of membership based the membership views received from peers.

Framework 212 implements balancing and forwarding of requests (e.g., using host logic 308 and node selector service). A request can enter through any node in the node group. If a service includes an owner (e.g., configured using the OWNER_SELECTION service option), framework 212 forwards requests targeting the service to its owner node. Node selector service employs a consistent hashing algorithm to designate an owner node for a given service per request. As a result, ownership per service is fixed as long as node group membership is stable. As nodes are added and removed from the node group, ownership per service can change. Framework 212 increments a replication epoch for a service in response to ownership changes. The consistent hashing algorithm ensures that ownership across services is evenly spread across group members.

Framework 212 implements replication across nodes in a node group (e.g., using service logic 309, host logic 208, and node selector service 336). Service state can be updated by a service instance at an owner node. In response, the owner node increments state version and replicates the updated state to peer nodes in the node group. Framework 212 can be configured to replicate updated state to all group members or only a portion of the group. If replication fails, then the request that triggered the state update fails and synchronization is triggered. If replication is successful, the updated state is persisted at the owner node. Framework 212 employs a consensus algorithm to determine whether replication is successful.

Framework 212 implements synchronization (e.g., using service logic 309 and host logic 308). Synchronization can be triggered on demand, periodically, or in response to replication failure. During synchronization, framework 212 selects an owner for a service. The owner node broadcasts a request to its peer nodes to obtain their latest state for the service. Framework 212 on the owner node chooses the best state based on replication epoch and version. The owner node then sends the selected best state for the service to the peer nodes in the node group.

In the embodiment of FIG. 3, each of runtime 302, core service objects 301C, and utility service instances 301U are described has performing specific functionalities of framework 212. Although specific examples are described where a given component performs a given function, any functionality of framework 212 described herein can be performed by runtime 302, core service objects 301C, utility service objects 301U, or a combination thereof. Moreover, although runtime 302 is described as having a specific component structure, the functionalities of runtime 302 can be performed by any of one or more logic components, including HTTP logic 305, host logic 308, service logic 309, and operation logic 311, or any other component.

In various embodiments, a component in framework 212 is described as "obtaining state" of a particular service. Service state can be obtained using various techniques, each of which ultimately results in either the state being obtained from cache 362 or service state data 314 in document store 352. In an embodiment, a client or service can obtain state by sending a request with the GET verb to the service. In such case, the service takes care of obtaining state from cache 362 or using the index service. Alternatively, a client or service can directly send a request with the POST verb to the index service to obtain service state.

In various embodiments, a component in framework 212 is described as "forwarding a request" to a target service or "sending a request" to a target service. To perform some work for a request, a client or service can send the request with the POST verb to the target service. To get service state, a client or service can send the request with the GET verb as described above. To modify service state, a client or service can send the request with the PATCH verb. To replace service state, a client or service can send the request with a PUT verb.

Figure 4:
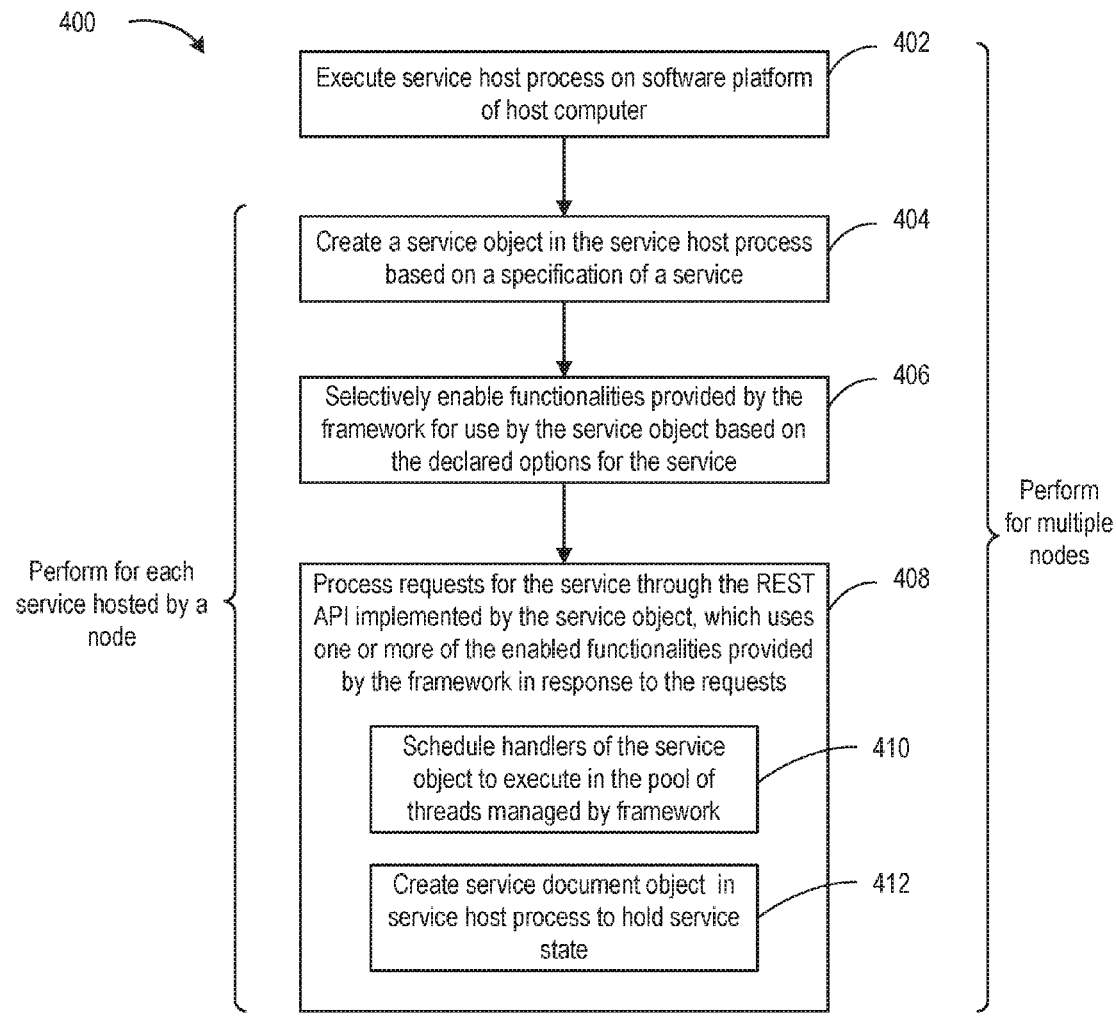
FIG. 4 is a flow diagram depicting a method of implementing a control plane for services in a computer system according to an embodiment.

FIG. 4 is a flow diagram depicting a method 400 of implementing a control plane for services in a computer system according to an embodiment. Method 400 can be used to implement DCP 122 in computer system 100. Method 400 begins at step 402, where an administrator executes a service host process 300 (e.g., node 206) on software platform 103 of a host computer 150. As discussed above, service host process 300 includes framework 212 that provides a plurality of functionalities. Example functionalities include synchronization, replication, persistence, consensus and leader election, and the like.

At step 404, runtime 302 in framework 212 creates a service object 301 in service host process 300 based on a specification of a service (e.g., service specifications 312). Service object 301 includes a REST API. The REST API supports a plurality of verbs (e.g., HTTP PUT, PATCH, GET, DELETE, POST, etc.). Service specifications 312 define declared options for the service. The declared options are used to define the capabilities of the service. For example, a declared option PERSISTENCE makes the service durable; a declared option REPLICATION makes the service a replicated service; a declared option OWNER_SELECTION adds consensus and leader election to the replication protocol, etc.

At step 406, runtime 302 selectively enables functionalities for use by service object 301 based on the declared options for the service. At step 408, runtime 302 processes requests for the service through the REST API implemented by service object 301, which uses one or more of the enabled functionalities provided by runtime 302 in response to the requests. Requests can originate from client applications 165, from remote services (services in another node), or from local services (services in this node). Request processing can vary depending on the enabled functionalities. For example, if the REPLICATION option is declared, requests that update service state are replicated across peer nodes. If the PERSISTENCE option is declared, updated state is stored as a new version of state in document store 352. Service object 301 uses enabled functionalities provided by runtime 302 through asynchronous operations. Thus, all service interactions take place through asynchronous message passing.

Step 408 includes a step 410, where runtime 302 schedules handlers 304 for service object 301 to execute in a pool of threads 306 managed by runtime 302. Thus, a single pool of threads is used across all services in the same service host process (node). Service handlers run in any available thread and do not share a call stack with other services. A handler can inherit functionality from runtime 302 (e.g., default handlers in service logic 309). A handler can instead include a functionality specified in the specification for the service (e.g., handlers that override the default handlers in service logic 309). A handler can both inherit functionality from runtime 302 and include custom functionality. Step 408 can include a step 412, where runtime 302 creates a service document object 364 to hold service state for use by handlers 304 of service object 301. Service document object 364 is created based on a specification of a service document (e.g., in service specifications 312).

Steps 404-412 can be performed for each service hosted by the node. Method 400 can be performed for multiple nodes of DCP 122. Multiple nodes can execute on a single host and/or across multiple hosts.

Figure 5:
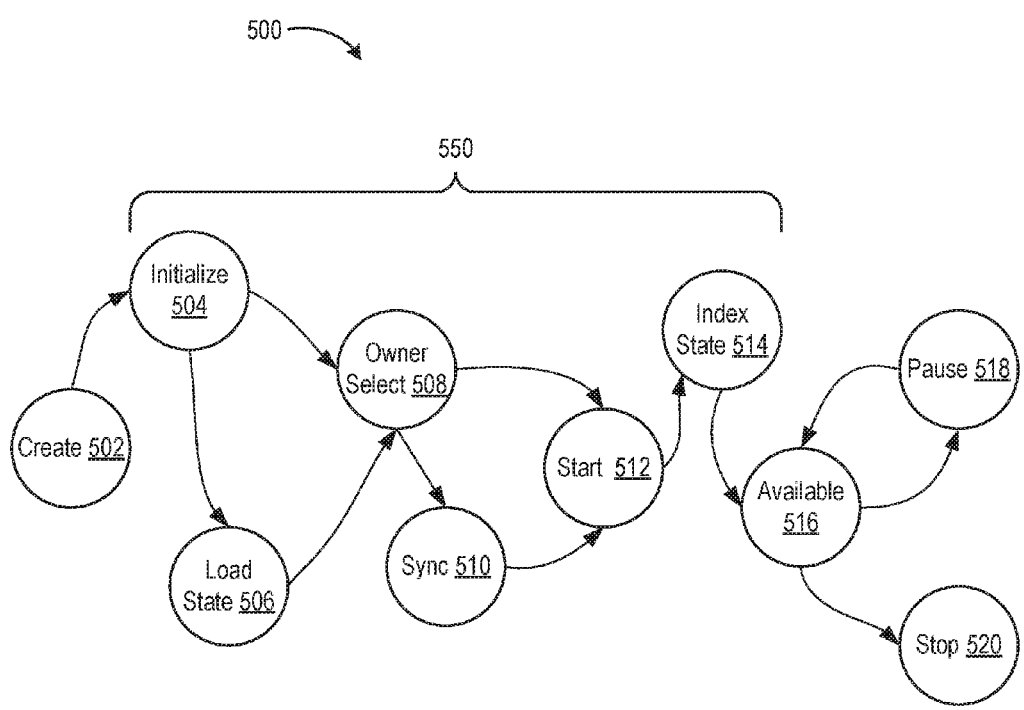
FIG. 5 is a state diagram showing service object lifecycle according to an embodiment.

FIG. 5 is a state diagram showing service object lifecycle 500 according to an embodiment. Services objects 301 transition through a plurality of processing stages of service object lifecycle 500. Service object lifecycle 500 begins at a create stage 502, where a service object is instantiated (e.g., using a service factory object or directly by the service host process) and is attached to the service host process. The service host process maintains a list of all attached service objects. Runtime 302 also generates a request to start the service, which is provided as input to a service start state machine that controls the startup portion 550 of service object lifecycle 500. Startup portion 550 is between create stage 502 and available stage 516.

After creation, service object lifecycle 500 proceeds to initialization stage 504, where runtime 302 initializes an operation object that encapsulates the startup request. For example, runtime 302 can initialize an authorization context for the startup request. Runtime 302 also determines whether the service being started is indexed and, if so, selects a load state stage 506 as the next stage. If the service being started is not indexed, runtime 302 selects an owner selection stage 508 as the next stage.

After initialization, service object lifecycle 500 can transition to load state stage 506 (i.e., if the service is indexed).

During the load state stage 506, runtime 302 loads the most recent service document of the service into memory and links it to the startup request. If there is an initial service state provided in the request to create the service, the initial service state is used as the most recent service document.

From either initialization stage 504 or load state stage 506, service object lifecycle 500 transitions to owner selection stage 508. At owner selection stage 508, runtime 302 determines whether the service being started is replicated (i.e., the REPLICATION service option is set). If not, runtime 302 transitions directly to a start stage 512. If the service being started is replicated, runtime 302 assigns a node ID of the owner node for the service to the service object and sets the next stage as a synchronization stage 510.

During synchronization stage 510, the service object synchronizes service state with other service objects for the service on peer nodes. From either owner selection stage 508 or synchronization stage 510, service object lifecycle 500 transitions to start stage 512. At start stage 512, the service object becomes visible to clients, processes any self-requests, and queues external requests. Runtime 302 calls a creation handler, start hander, or both of the service object during start stage 512.

From start stage 512, service object lifecycle 500 transitions to index state stage 514, where runtime 302 requests index service to index and store the service document object linked to the service object. From index state stage 514, service object lifecycle 500 transitions to available stage 516. At available stage 516, the service object de-queues and processes requests.

From available stage 516, service object lifecycle 500 can transition to pause stage 518. In pause stage 518, the service is paused (e.g., runtime 302 can pause a service in response to memory pressure). Service object lifecycle 500 can transition back to available stage 516 from pause stage 518 (e.g., runtime 302 can resume a paused service in response to a request targeting the service). From available stage 516, service object lifecycle 500 can transition to a stop stage 520. At stop stage 520, runtime 302 reclaims resources used by the service object. Runtime 302 calls a stop handler of the service object during stop stage 520 and removes the service object from the attached service list of the service host process.

Decentralized Control Plane Memory Management

Figure 8:
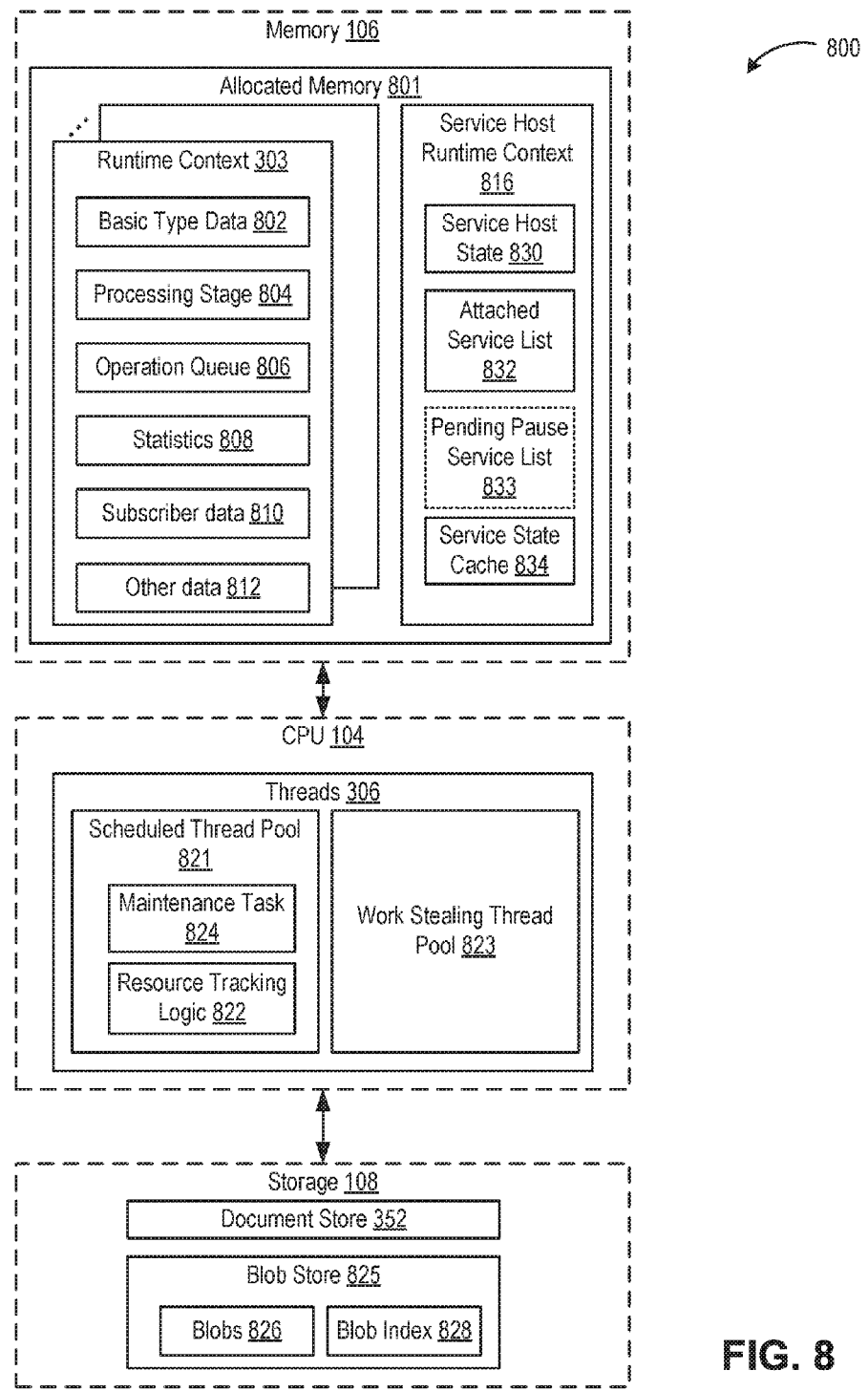
FIG. 8 is a block diagram depicting a snapshot of runtime state of a node executing on a host according to an embodiment.

FIG. 8 is a block diagram depicting a snapshot of runtime state 800 of a node 206 executing on a host 150 according to an embodiment. As described above, node 206 is an instance of a service host process that executes on software platform 103 of host 150 and includes runtime 302 of DCP 122 configured to manage service instance lifecycle. Services 123 of DCP 122 are represented by service objects 301 in the service host process.

Software platform 103 allocates memory to the service host process ("allocated memory 801"). For example, if the service host process is a Java® process, allocated memory 801 comprises a heap of the Java® runtime environment. The memory footprint of node 206 includes runtime contexts 303 of service objects 301 and a runtime context for the service host process ("service host runtime context 816"). Service host runtime context 816 includes service host state 830, attached service list 832, and service state cache 814. Service host state 830 includes various parameters of the service host process, such as IP address, TCP port, timeout values, and the like. Attached service list 832 maps service IDs (e.g., URIs) to service instances currently attached to (associated with) the service host process (e.g., services that have been created, but not stopped). Service state cache 834 includes in-memory copies of recently accessed service state. In an embodiment, service host runtime context 816 also includes a pending pause service list 833. Pending pause service list 833 includes a list of service instances that have been selected to be paused in response to memory pressure.

Each runtime context 303 includes various instance variables associated with a service object 301, such as basic type data 802 (e.g., integers, strings, Booleans, etc.), processing stage 804, operation queue 806, statistics 808, subscriber data 810, and various other data 812. Processing stage 804 stores a value indicative of the current processing stage of the service object lifecycle. Processing stages correspond to stages of service object lifecycle 500 described above in FIG. 5 (e.g., created, initializing, loading initial state, synchronizing, available, paused, stopped, etc.). Operation queue 806 includes any operations that have yet to be processed by the service object. Statistics 808 include various event data logged for the service object if the service includes the INSTRUMENTATION service option. Subscriber data 810 includes data describing subscribers to the service (if any). Note that runtime context 303 for a service object only includes data related to operation of the service object and does not service state. Rather, service state is stored in document store 352, as described above.

Upon startup of service host process, runtime 302 creates threads 306, which execute on CPU 104. In an embodiment, threads 306 include a scheduled thread pool 821 and a work stealing thread pool 823. Work stealing thread pool 823 provides threads for execution of service handlers and request processing. Scheduled thread pool 821 provides threads for the periodic execution of scheduled tasks. One task scheduled by runtime 302 is a maintenance task 824. Maintenance task 824 includes a state machine configured to transition through a sequence of stages, including a memory management stage that executes resource tracking logic 822.

Resource tracking logic 822 manages service state cache 834 and clears the cache of stale or expired service states. Resource tracking logic 822 also monitors the memory consumed by runtime contexts 303. If the consumed memory exceeds a threshold, resource tracking logic 822 can selectively pause a number of service objects 301. For each paused service object, resource tracking logic 822 serializes the service object to a blob comprising a plurality of bytes. The blob represents at least a portion of runtime context 303. Resource tracking logic 822 stores blobs 826 in a blob store 825 maintained in storage 108. In an embodiment, blob store 825 is managed by an instance of a core service, referred to as the "service context index service" (one of other services 340). A blob index 828 relates identifiers for service objects (e.g., URIs) to blobs 826 in blob store 825. When runtime 302 resumes a service object, resource tracking logic 822 obtains a respective blob 826 by querying blob index 828 and deserializes the blob to regenerate at least a portion of runtime context 303 for a created service object. The memory management process is described further below.

Figure 9:
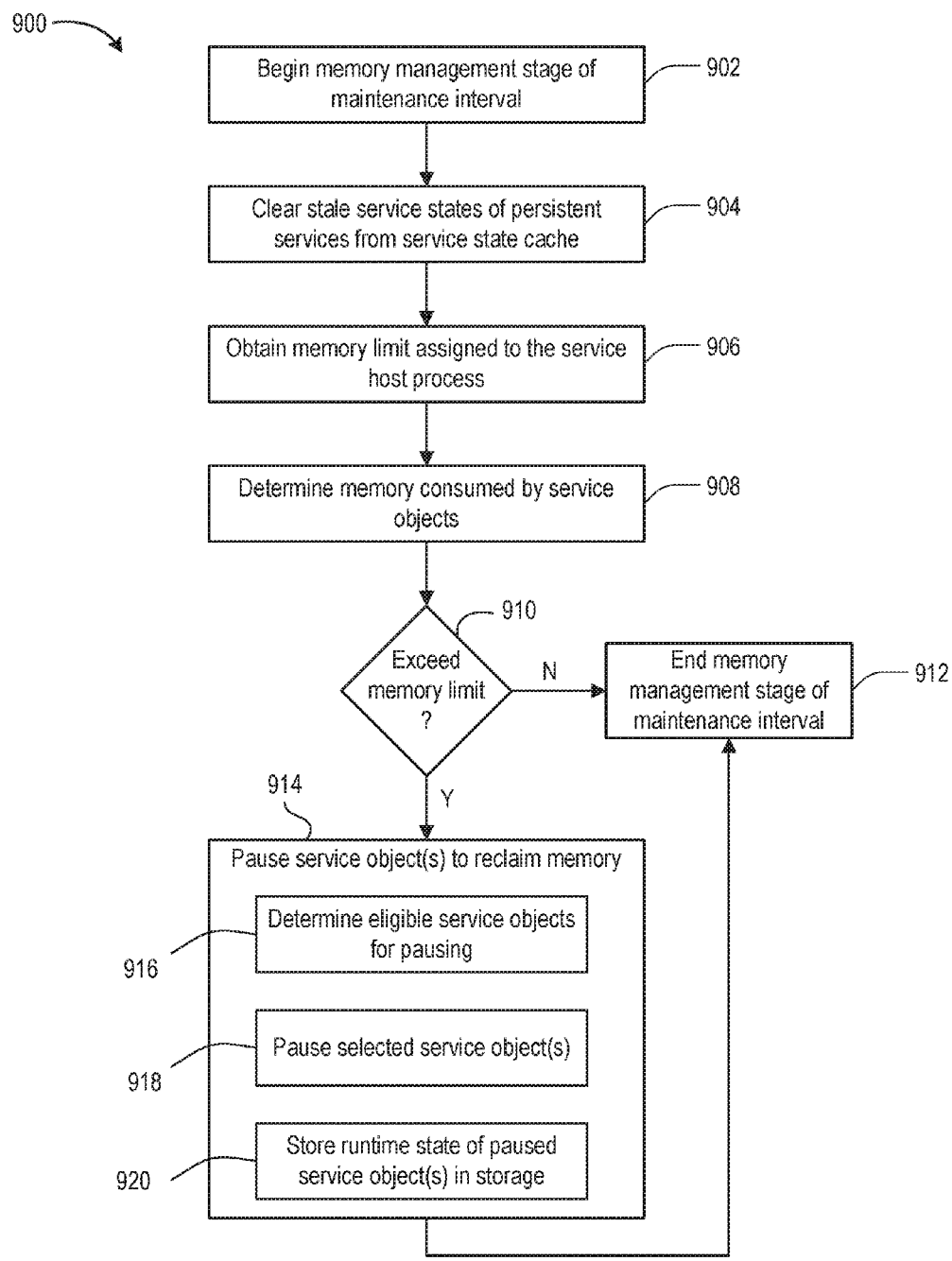
FIG. 9 is a flow diagram depicting a method of managing memory in a control plane for services in a computer system according to an embodiment.

FIG. 9 is a flow diagram depicting a method 900 of managing memory in a control plane for services in a computer system according to an embodiment. Method 900 is performed by runtime 302. Method 900 begins at step 902, where runtime 302 begins a memory management stage of a given maintenance interval. At step 904, runtime 302 clears stale service states for persistent services from service state cache 834. Service state cache 834 can store service states of various services. For services that have the PERSISTANCE service option, their service states are stored in document store 352. If the age of a persistent service state in service state cache 834 satisfies a threshold, the persistent service state is cleared from the cache.

At step 906, runtime 302 obtains a memory limit assigned to the service host process. In an embodiment, the memory limit is a percentage of an amount of memory allocated for use by the service host process (i.e., allocated memory 801). At step 908, runtime 302 determines the memory consumed by the service objects attached to the service host process. In an embodiment, runtime 302 determines the amount of consumed memory by multiplying the number of service objects attached to the service host process by an estimated object memory cost. The estimated object memory cost can include an estimated size of runtime context 303 of each of the service instances.

At step 910, runtime 302 determines if the memory consumed by the service objects attached to the service process exceed the memory limit. If not, method 900 proceeds to step 912, where runtime 302 ends the memory management stage of the maintenance interval. Otherwise, method 900 proceeds to step 914, where runtime 302 pauses one or more service objects to reclaim memory. In an embodiment, step 914 includes steps 916-920. At step 916, runtime 302 determines those service objects attached to the service host process that are eligible for pausing. Various eligibility criteria are described below. At step 918, runtime 302 pauses one or more selected service objects selected from the eligible service objects. At step 920, runtime 302 stores runtime state of paused service object(s) in persistent storage (e.g., blob store 825). The paused service objects are detached from the service host process (disassociated with the service host process).

In embodiments described herein, the service host process is a Java® process that executes within a runtime environment having garbage collection. In general, if the service host process executes in a runtime environment with garbage collection, detaching or disassociating the paused service objects from the service host process includes removing references to those objects allowing the memory consumed by those objects to be reclaimed via garbage collection. In embodiments where the service host process does not execute within a runtime environment (e.g., a compiled C/C++ process), detaching or disassociating the paused service objects from the service host process further includes deleting the objects to free the memory consumed by the objects.

Figure 10:
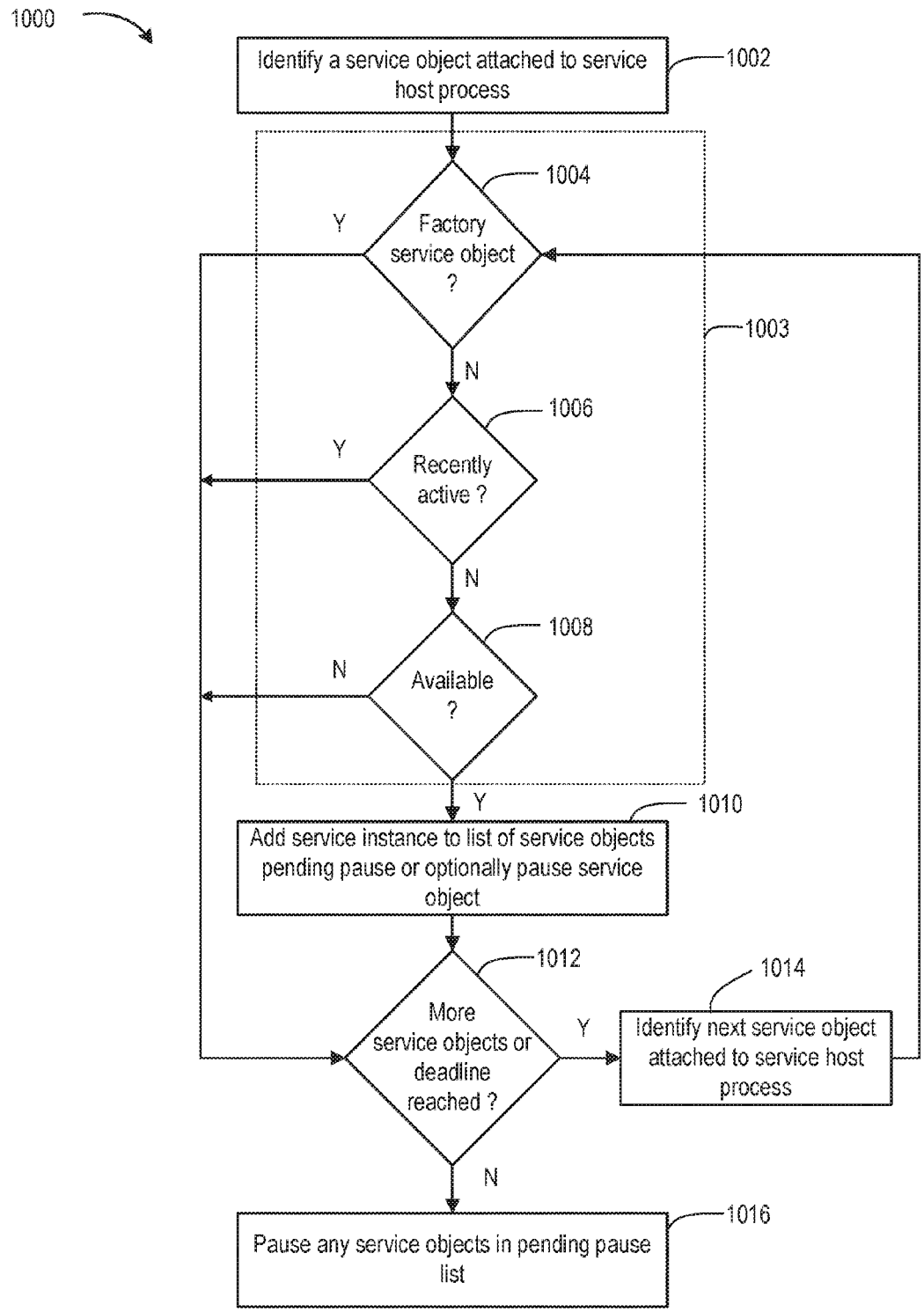
FIG. 10 is a flow diagram depicting a method of selecting service instances to be paused in response to memory pressure according to an embodiment.

FIG. 10 is a flow diagram depicting a method 1000 of selecting service objects to be paused in response to memory pressure according to an embodiment. Method 1000 is performed by runtime 302. At step 1002, runtime 302 identifies a service object attached to the service host process (e.g., runtime 302 selects the first service object in attached service list 832). At step 1003, runtime 302 compares the selected service object against pre-defined criteria that dictates whether the selected service object is eligible to be paused. In an embodiment, step 1003 begins at step 1004, where runtime 302 determines whether the selected service object is a factory service object. If so the selected service object is deemed ineligible for pausing and method 1000 proceeds to step 1012. Factory service objects are needed to create new service objects and thus it would be inefficient to pause and restore factory service objects. If the selected service object is not a factory service object, method 1000 proceeds from step 1004 to step 1006.

At step 1006, runtime 302 determines whether the selected service object has been recently active. In an embodiment, a service object is deemed to be "recently active" if its associated service state has been updated within a threshold number of maintenance intervals (e.g., two maintenance intervals). If the selected service object has been recently active, the selected service object is deemed to be ineligible for pausing and method 1000 proceeds from step 1006 to step 1012. Otherwise, method 1000 proceeds to step 1008. At step 1008, runtime 302 determines whether the selected service object is in the available processing stage of the service object lifecycle. If a service object is in the midst of starting, its runtime context may not be fully initialized and, in any case, the service object is active. If the selected service object is not in the available processing stage, method 1000 proceeds to step 1012. Otherwise, method 1000 exits eligibility determination step 1003. FIG. 10 shows three example eligibility tests, but method 1000 can include other eligibility tests. For example, runtime 302 can deem service objects that do not have the PERSISTENT option set to be ineligible for pausing. Stateless service objects can include in-memory state not backed by persistent storage, which may be lost if the stateless service object is paused and detached from the service host process. In another example, service objects that have not been created by a service factory can be deemed ineligible for pausing. Such service objects may have been created directly in startup code of the service host process and may not be able to be recreated if paused and detached from the service host process.

Method 1000 proceeds from step 1003 to step 1010. At step 1010, runtime 302 deems the selected service objecte as eligible to be paused and adds the selected service object to a list of service objects pending pause (e.g., pending pause service list 833). In an embodiment, the process for pausing a service includes an asynchronous request to the service context index service to store runtime state of the paused service instance. Thus, some interval of time elapses before a service is actually paused. Maintaining a list of service instances pending pause provides the opportunity for the pause to be aborted should the service object receive a request for processing. In another embodiment, the eligible service object can be immediately paused (i.e., no pending pause service list is used). An embodiment of pausing a service object is described below with respect to FIG. 11.

Method 1000 proceeds from step 1010 to step 1012. At step 1012, runtime 302 determines whether there are more service objects attached to the service host process to be processed or whether a deadline has been reached. Maintenance task 824 can specify a time in which resource tracking logic 822 must complete its memory management process. If there are more service objects to process and the deadline has not been reached, method 1000 proceeds from step 1012 to step 1014, where runtime 302 identifies the next service object attached to the service host process for processing. Method 1000 returns to step 1003 from step 1014 and processes the next service object. If there are no more service objects to process or the deadline has been reached, method 1000 proceeds from step 1012 to step 1016, where runtime pauses any service objects in the pending pause list.

Figure 11:
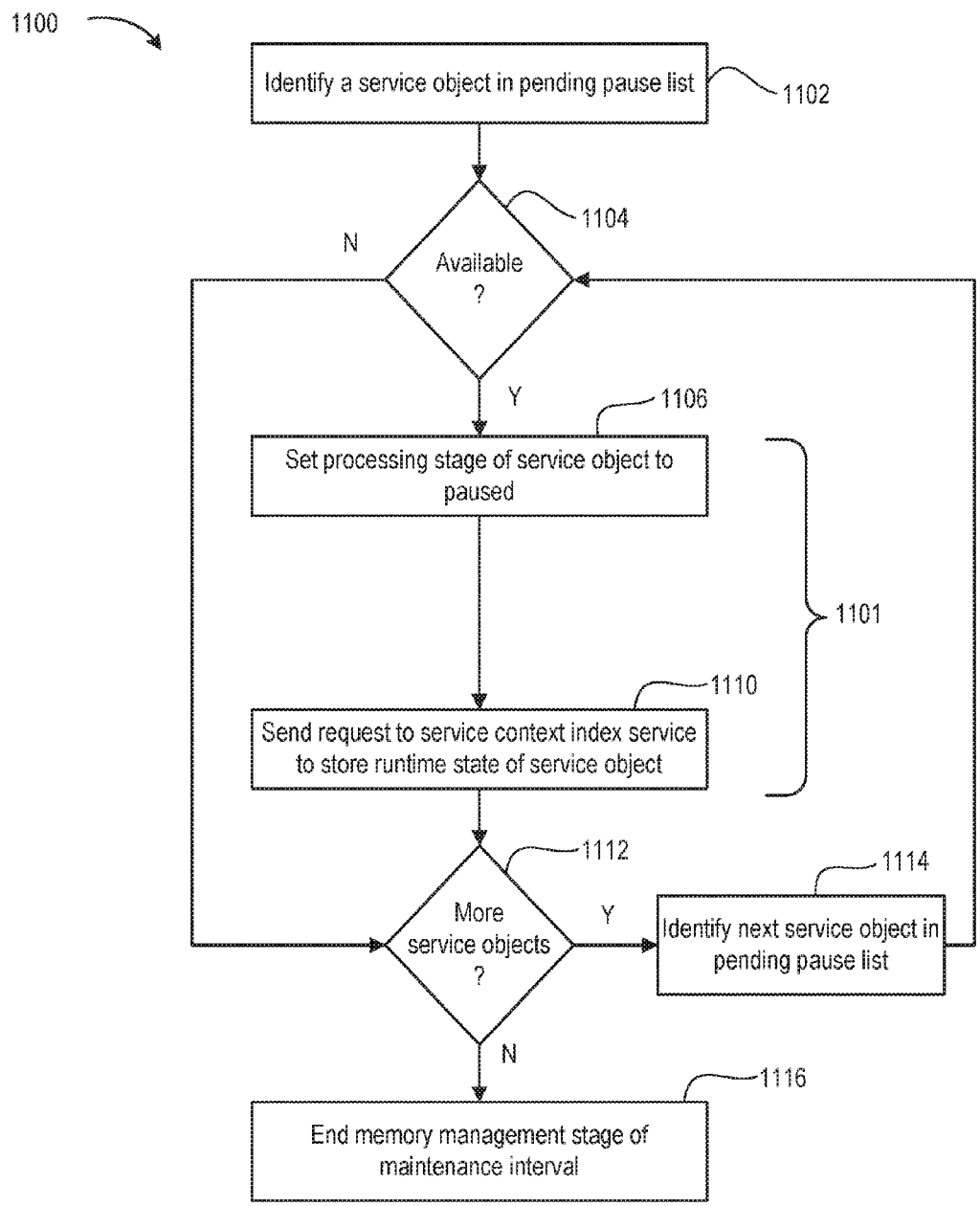
FIG. 11 is a flow diagram depicting a method of pausing service instances according to an embodiment.

FIG. 11 is a flow diagram depicting a method 1100 of pausing service objects according to an embodiment. Method 1100 is performed by runtime 302. Method 1100 begins at step 1102, where runtime 302 identifies a service object in the pending pause list (e.g., pending pause service list 833). At step 1104, runtime 302 determines whether the selected service object to be paused is in the available processing stage of the service object lifecycle. If the service object to be paused has transitioned to some other processing stage since the eligibility determination, it is not paused. If the service object to be paused is not in the available processing stage, method 1100 proceeds from step 1004 to step 1112.

Otherwise, method 1100 proceeds to step 1106, where runtime 302 sets the processing stage of the service object to be paused to the paused stage. At step 1108, runtime 302 sends a request to the service context index service to store the runtime state of the service object. An embodiment of storing runtime state for a paused service instance is described below with respect to FIG. 13. Steps 1106 and 1110 comprise a process 1101 of pausing a service object. In an embodiment where the service object can be immediately paused after being determined to be eligible, the process 1101 can be performed to pause the service object.

Method 1100 proceeds from step 1110 to step 1112, where runtime 302 determines whether there are more service objects pending pause. If so, method 1100 proceeds to step 1114, where runtime 302 identifies a next service object in the pending pause list. Method 1100 then returns to step 1104 and processes the next service object to be paused. If at step 1112 runtime 302 determines there are no more service objects to be paused, method 1100 proceeds to step 1116. At step 1116, runtime 302 ends the memory management stage of the maintenance interval.

Figure 12:
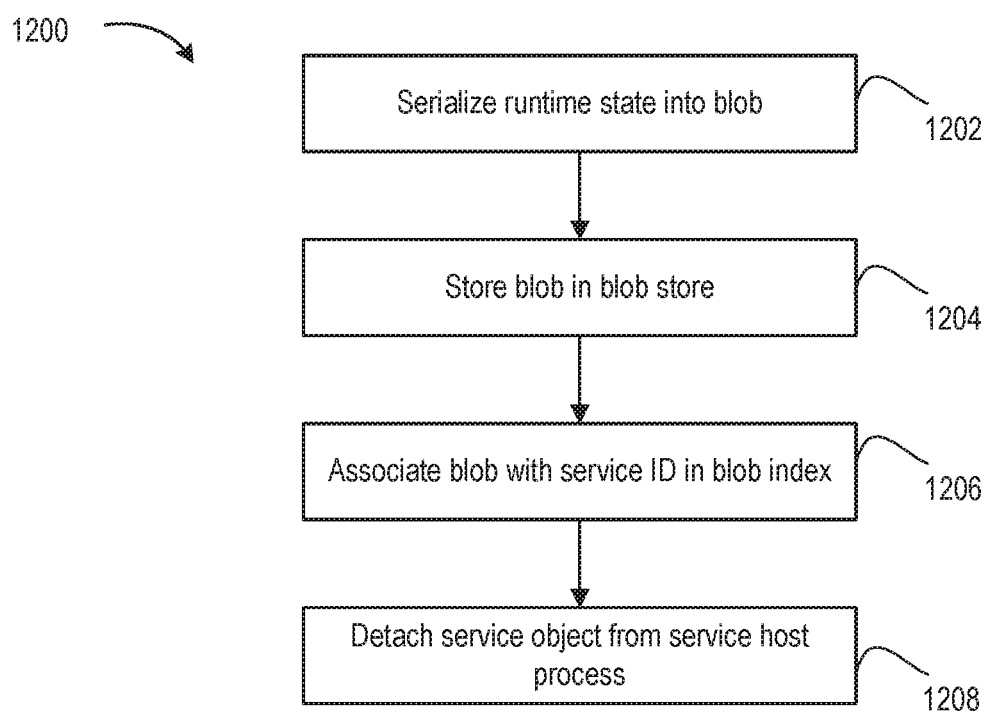
FIG. 12 is a flow diagram depicting a method of persistently storing runtime state of a paused service instance according to an embodiment.

FIG. 12 is a flow diagram depicting a method 1200 of persistently storing runtime state of a paused service object according to an embodiment. Method 1200 can be performed by runtime 302 or by logic of a core service object, such as a service context index service. For purposes of clarity by example, method 1200 is described as being performed by a service context index service. Method 1200 begins at step 1202, where the service context index service serializes the runtime state of the paused service object into a blob comprising a plurality of bytes. The serialized runtime state includes at least a portion of runtime context 303 of the paused service object. Notably, some fields of runtime context 303 may be transient or are otherwise not part of the the serialized runtime state.

At step 1204, the service context index service stores the blob in blob store 825. At step 1206, the service context index service associates the blob with a service ID (e.g., URI of the paused service object) in blob index 828. At step 1208, the service context index service triggers detachment of the paused and serialized service object from the service host process. For example, runtime 302 can set a completion handler when sending the request to the service context index service to serialize the runtime state of the paused service object. The service context index service can execute the completion handler, which detaches the paused and serialized service object from the service host process (e.g., removes the service object from the attached service list 832). Detaching the paused and serialized service object from the service host process results in the memory consumed by the object being reclaimed. In some embodiments, the completion handler can perform other tasks. For example, prior to detaching the service object from the service host process, the completion handler can determine if the paused service object has received a request before having its state serialized. If so, the completion handler can abort the pause and set the processing stage of the service object to the available stage so that the request can be processed.

Figure 13:
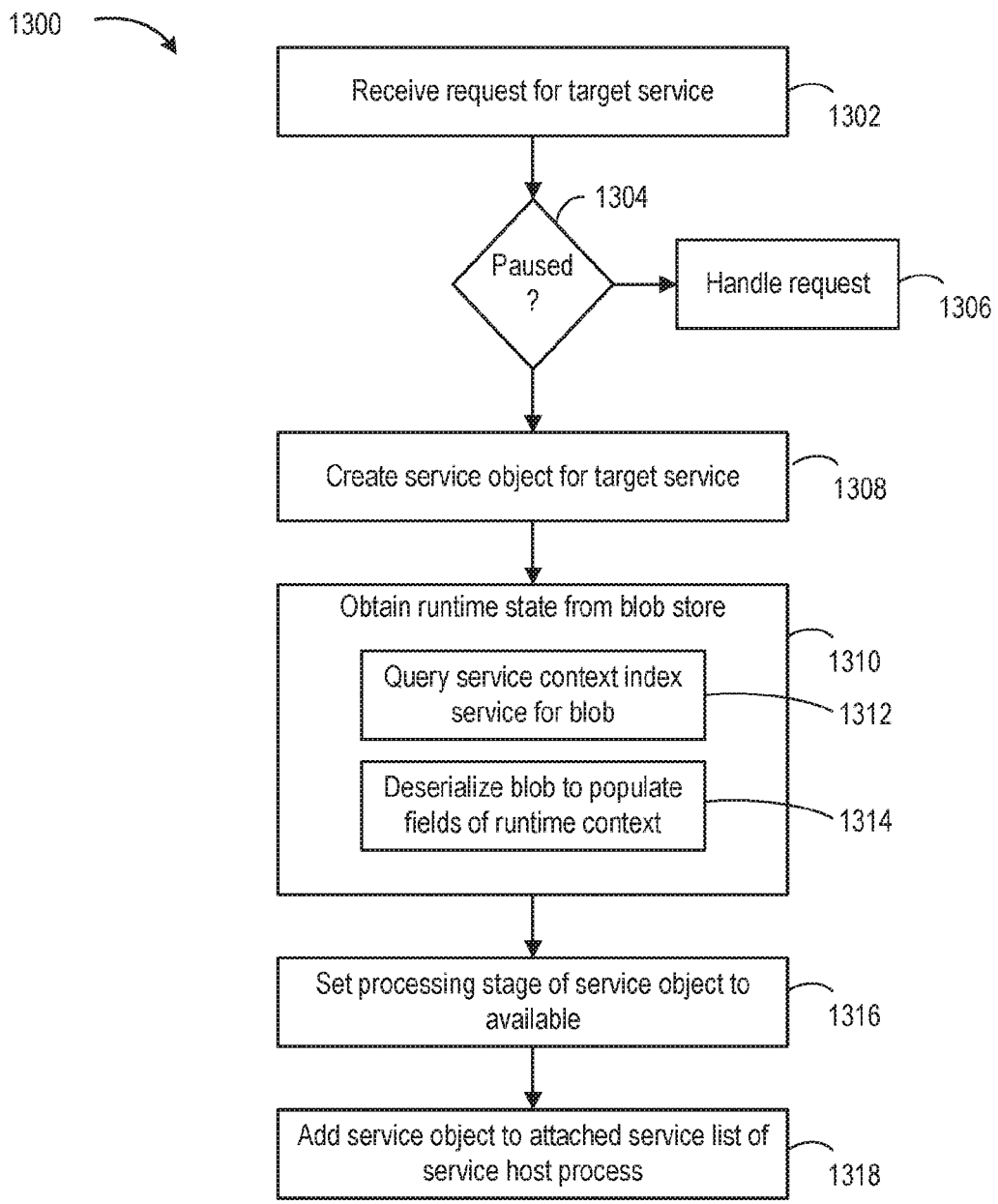
FIG. 13 is a flow diagram depicting a method of resuming a paused service according to an embodiment.

FIG. 13 is a flow diagram depicting a method 1300 of resuming a paused service according to an embodiment. Method 1300 is performed by runtime 302. Method 1300 begins at step 1302, where runtime 302 receives a request for a target service. At step 1304, runtime 302 determines whether the service has been paused. That is, runtime 302 determines whether there is any service object created for the target service on the node. If a service object is available, method 1300 proceeds from step 1304 to step 1306, where runtime 302 handles the request (e.g., runtime 302 forwards the request to the service object for processing). Otherwise, method 1300 proceeds to step 1308.

At step 1308, runtime 302 creates a service object for the target service. Runtime 302 can create the service object directly or can send a POST request to a corresponding service factory. At step 1310, runtime 302 obtains runtime state for the created service object from blob store 825. Step 1310 can include steps 1312 and 1324. At step 1312, runtime 302 queries the service context index service to obtain a blob 826 from blob store 825. At step 1314, runtime 302 or the service context index service deserializes the blob to populate fields of runtime context 303 for the created service object.

At step 1316, runtime 302 sets the processing stage of the created service object to the available stage. At step 1318, runtime 302 attaches the created service object to the service host process. For example, runtime 302 adds the service object to attached service list 832.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing memory of a control plane for services in a computer system, comprising:
    executing a service host process of the control plane on a software platform of the computer system, the service host process including runtime software configured to manage lifecycles of objects representing the services, the objects being associated with the service host process and being marked as available;
    determining an amount of memory in the computer system consumed by the objects;
    marking a plurality of the objects as paused in response to determining that the amount of memory consumed by the objects exceeds a threshold;
    storing at least a portion of a runtime context of each of the plurality of objects in storage of the computer system; and
    disassociating the plurality of objects from the service host process to reclaim the memory consumed by the objects.

2. The method of claim 1, wherein the step of determining the amount of memory in the computer system consumed by the objects comprise:
    multiplying a number of the objects attached to the service host process by an estimated object memory cost.

3. The method of claim 2, wherein the estimated object memory cost includes an estimated size of the runtime context of each of the plurality of objects.

4. The method of claim 1, wherein the threshold comprises a memory limit assigned to the service host process, the memory limit being a percentage of an amount of memory allocated for use by the service host process.

5. The method of claim 1, wherein the step of marking comprises:
    comparing the objects against predefined criteria, the predefined criteria including that the service represented by the respective object is a factory service configured to create service instances.

6. The method of claim 5, wherein the steps of determining, marking, storing, and disassociating are performed during each of a plurality of maintenance intervals, and wherein the predefined criteria further includes that the state of the service represented by the respective object has not been updated in a threshold number of the plurality of maintenance intervals.

7. The method of claim 1, wherein the step of storing comprises:
    serializing a plurality of fields of the runtime context for each of the plurality of objects to a blob comprising a plurality of bytes;
    storing each blob in a blob store in the storage of the computer system; and associating each blob in the blob store with an identifier for a respective one of the plurality of objects in a blob index for the blob store.

8. The method of claim 1, further comprising:
receiving a request for a target service of the services;
creating an object representing the target service;
retrieving at least a portion of a runtime context for the object from the storage of the computer system;
marking the object as available; and
associating the object to the service host process.

9. The method of claim 8, wherein the step of retrieving comprises:
querying a blob index with an identifier for the object to obtain a blob from a blob store in the storage of the computer system;
deserializing the blob to populate a plurality of fields of the runtime context for the object.

10. A non-transitory computer readable medium comprising instructions, which when executed in a computer system, causes the computer system to carry out a method of managing memory of a control plane for services in a computer system, comprising:
executing a service host process of the control plane on a software platform of the computer system, the service host process including runtime software configured to manage lifecycles of objects representing the services, the objects being associated with the service host process and being marked as available;
determining an amount of memory in the computer system consumed by the objects;
marking a plurality of the objects as paused in response to the amount of memory consumed by the objects exceeding a threshold;
storing at least a portion of a runtime context of each of the plurality of objects in storage of the computer system; and
disassociating the plurality of objects from the service host process to reclaim the memory consumed by the objects.

11. The non-transitory computer readable medium of claim 10, wherein the step of determining the amount of memory in the computer system consumed by the objects comprise:
multiplying a number of the objects attached to the service host process by an estimated object memory cost.

12. The non-transitory computer readable medium of claim 11, wherein the estimated object memory cost includes an estimated size of the runtime context of each of the plurality of objects.

13. The non-transitory computer readable medium of claim 10, wherein the threshold comprises a memory limit assigned to the service host process, the memory limit being a percentage of an amount of memory allocated for use by the service host process.

14. The non-transitory computer readable medium of claim 10, wherein the step of marking comprises:
comparing the objects against predefined criteria, the predefined criteria including that the service represented by the respective object is a factory service configured to create service instances.

15. The non-transitory computer readable medium of claim 14, wherein the steps of determining, marking, storing, and diassociating are performed during each of a plurality of maintenance intervals, and wherein the predefined criteria further includes that the state of the service represented by the respective object has not been updated in a threshold number of the plurality of maintenance intervals.

16. The non-transitory computer readable medium of claim 10, wherein the step of storing comprises:
serializing a plurality of fields of the runtime context for each of the plurality of objects to a blob comprising a plurality of bytes;
storing each blob in a blob store in the storage of the computer system; and
associating each blob in the blob store with an identifier for a respective one of the plurality of objects in a blob index for the blob store.

17. The non-transitory computer readable medium of claim 10, further comprising:
receiving a request for a target service of the services;
creating an object representing the target service;
retrieving at least a portion of a runtime context for the object from the storage of the computer system;
marking the object as available; and
associating the object to the service host process.

18. The non-transitory computer readable medium of claim 17, wherein the step of retrieving comprises:
querying a blob index with an identifier for the object to obtain a blob from a blob store in the storage of the computer system;
deserializing the blob to populate a plurality of fields of the runtime context for the object.

19. A computer system, comprising:
a hardware platform having a central processing unit (CPU), memory, and storage;
a software platform executing on the hardware platform, the software platform includes a service host process of a control plane, the service host process including runtime software configured to manage lifecycles of objects representing the services, the objects being associated with the service host process and being marked as available, where the runtime is executable by the CPU to:
determine an amount of the memory consumed by the objects;
mark a plurality of the objects as paused in response to the amount of memory consumed by the objects exceeding a threshold;
store at least a portion of a runtime context of each of the plurality of objects in the storage; and
disassociate the plurality of objects from the service host process to reclaim the memory consumed by the objects.

20. The computer system of claim 19, wherein the runtime is executable by the CPU to:
receive a request for a target service of the services;
create an object representing the target service;
retrieve at least a portion of a runtime context for the object from the storage;
mark the object as available; and
associate the object to the service host process.

* * * * *